United States Patent
Natsume et al.

(10) Patent No.: US 7,642,900 B2
(45) Date of Patent: Jan. 5, 2010

(54) ALARM DEVICE AND ALARM SYSTEM

(75) Inventors: Kazuyuki Natsume, Toyohashi (JP); Tetsuya Hara, Okazaki (JP)

(73) Assignee: DENSO CORPORATION, Kariya (JP)

(*) Notice: Subject to any disclaimer, the term of this patent is extended or adjusted under 35 U.S.C. 154(b) by 349 days.

(21) Appl. No.: 11/889,080

(22) Filed: Aug. 9, 2007

(65) Prior Publication Data
US 2008/0036577 A1 Feb. 14, 2008

(30) Foreign Application Priority Data
Aug. 10, 2006 (JP) ............................. 2006-218661

(51) Int. Cl.
*B60Q 1/00* (2006.01)
(52) U.S. Cl. .................. 340/425.5; 340/426.11; 340/426.25; 340/428; 340/457.1; 340/438; 340/384.4; 701/1; 701/96
(58) Field of Classification Search ............ 340/425.5, 340/426.11, 426.26, 428, 457.1, 438, 439, 340/384.4; 701/1, 96
See application file for complete search history.

(56) References Cited

U.S. PATENT DOCUMENTS

| | | | |
|---|---|---|---|
| 6,314,352 B1 | 11/2001 | Kunimatsu et al. | |
| 7,061,375 B2 * | 6/2006 | Koike et al. | 340/457.1 |
| 2004/0150517 A1 * | 8/2004 | Okita et al. | 340/457.1 |
| 2006/0071769 A1 | 4/2006 | Ide et al. | |

FOREIGN PATENT DOCUMENTS

JP    A-H09-212767    8/1997

* cited by examiner

*Primary Examiner*—Tai T Nguyen
(74) *Attorney, Agent, or Firm*—Posz Law Group, PLC

(57) ABSTRACT

An alarm device for a vehicle includes state information obtaining unit, alarm information obtaining unit, alarming unit, and controlling unit. The state information obtaining obtains as state information at least one of information of an occupant, information of the vehicle, and information of a surrounding of the vehicle. The alarm information obtaining unit obtains alarm information. The alarming unit informs the occupant of the alarm information. The controlling unit determines an expiration time of the alarm information based on the state information obtained by the state information obtaining unit when the controlling unit receives the alarm information from the alarm information obtaining unit, wherein the control unit causes the alarming unit to inform the occupant of the alarm information while the expiration time is valid.

24 Claims, 9 Drawing Sheets

FIG. 3A

| SERVICE ID | IMPORTANCE | EXPIRATION TIME | MESSAGE |
|---|---|---|---|
| S001 | HIGH | 60 min. | LITTLE GAS LEFT. LOOK FOR GS? |
| S002 | MIDDLE | 3 min. | APPROACHING TUNNEL. CLOSE WINDOW? |
| S003 | HIGH | 1 min. | RAIN AHEAD. CLOSE WINDOW? |
| S004 | MIDDLE | 3 min. | DENSE FOG AHEAD. TURN LAMP ON? |

| ACTION ID | SERVICE ID | TARGET | TIMING | ACTION |
|---|---|---|---|---|
| A001 | S001 | NAVIGATION DEVICE | ACCEPTING TIME OF SUGGESTION | START GUIDING A ROUTE TO GS |
| A002 | S001 | BODY ECU | ARRIVAL TIME AT GS | OPEN FILLER PORT |
| A003 | S001 | BODY ECU | ARRIVAL TIME AT GS | UNLOCK DRIVER'S SEAT DOOR |
| A004 | S001 | BODY ECU | ARRIVAL TIME AT GS | TURN OFF HEAD LIGHT |
| A005 | S002 | BODY ECU | ACCEPTING TIME OF SUGGESTION | CLOSE ALL WINDOWS |
| A006 | S003 | BODY ECU | ACCEPTING TIME OF SUGGESTION | CLOSE ALL WINDOWS |
| A006 | S004 | BODY ECU | ACCEPTING TIME OF SUGGESTION | TURN ON FOG LAMP |

ALARM DEVICE AND ALARM SYSTEM

CROSS REFERENCE TO RELATED APPLICATION

This application is based on and incorporates herein by reference Japanese Patent Application No. 2006-218661 filed on Aug. 10, 2006.

BACKGROUND OF THE INVENTION

1. Field of the Invention

The present invention relates to an alarm device that transmits an inquiry to an occupant.

2. Description of Related Art

In late years, various automatic control controls in a vehicle have been discussed. The automatic controls include an automatic system, in which activation of the light before entering into a tunnel, the operation for closing the door window, a change to the recirculation of air in the air conditioner are performed based on information from, for example, a navigation system. However, such an automatic control is not based on common intention of all people. For example, the above automatic control is adapted to be performed based on the average sense of all people. Therefore, a control, which corresponds to the intention of the actual occupant, may not be always performed. Therefore, in some cases, a control unsuitable for the intention of the occupant may be performed, and therefore, the occupant may feel unpleasantly.

Thus, the invention of JP-A-2000-127869 corresponding to U.S. Pat. No. 6,314,352 below is suggested to solve the above disadvantages. In the automatic control system according to the invention, a control content is alarmed to an occupant beforehand. Then, an automatic control is performed for the first time when the occupant gives the permission or rejection of the execution of the alarmed control content.

However, The occupant may not answer to the inquiry from the automatic control system immediately. Also, the occupant may want to put off the answer. In the automatic control system described in JP-A-2000-127869, if the answer (response) is not provided within a predetermined time, the automatic control is forcibly performed (see paragraph "0031" in JP-A-2000-127869 corresponding to column 8 II. 1-49 of U.S. Pat. No. 6,314,352). Therefore, in a case, where the predetermined time is too long, the situation may changes, and therefore the inquiry (suggestion) in itself may become meaningless. In this case, start of the automatic control may also be delayed. Also, on the contrary, if predetermined time is too short, the occupant may have dissatisfaction saying "I intended to answer it a little bit later".

SUMMARY OF THE INVENTION

The present invention is made in view of the above disadvantages. Thus, it is an objective of the present invention to address at least one of the above disadvantages.

To achieve the objective of the present invention, there is provided an alarm device for a vehicle, which includes state information obtaining unit, alarm information obtaining unit, alarming unit, and controlling unit. The state information obtaining obtains as state information at least one of information of an occupant, information of the vehicle, and information of a surrounding of the vehicle. The alarm information obtaining unit obtains alarm information. The alarming unit informs the occupant of the alarm information. The controlling unit determines an expiration time of the alarm information based on the state information obtained by the state information obtaining unit when the controlling unit receives the alarm information from the alarm information obtaining unit, wherein the control unit causes the alarming unit to inform the occupant of the alarm information while the expiration time is valid.

To achieve the objective of the present invention, there is also provided an alarm system for a vehicle, which includes an expiration time determining device and an alarm device. The expiration time determining device has a state information obtaining unit that obtains as state information at least one of information of an occupant, information of the vehicle, and information of a surrounding of the vehicle. The expiration time determining device has an alarm information obtaining unit that obtains alarm information. The expiration time determining device has a first controlling unit that determines an expiration time of the alarm information based on the state information obtained by the state information obtaining unit. Here, the first controlling unit incorporates the expiration time to the alarm information and sends the incorporated alarm information to the alarm device. The alarm device has an alarming unit that informs the occupant of the incorporated alarm information. The alarm device has a second controlling unit that causes the alarming unit to inform the occupant of the incorporated alarm information received from the expiration time determining device while the expiration time, which is incorporated to the incorporated alarm information, is valid.

BRIEF DESCRIPTION OF DRAWINGS

The invention, together with additional objectives, features and advantages thereof, will be best understood from the following description, the appended claims and the accompanying drawings in which:

FIG. 3A is a table layout pattern for explaining a service table of one embodiment of the present invention;

FIG. 3B is a table layout pattern for explaining an action table of one embodiment of the present invention;

DETAILED DESCRIPTION OF PREFERRED EMBODIMENTS

Figure 1:
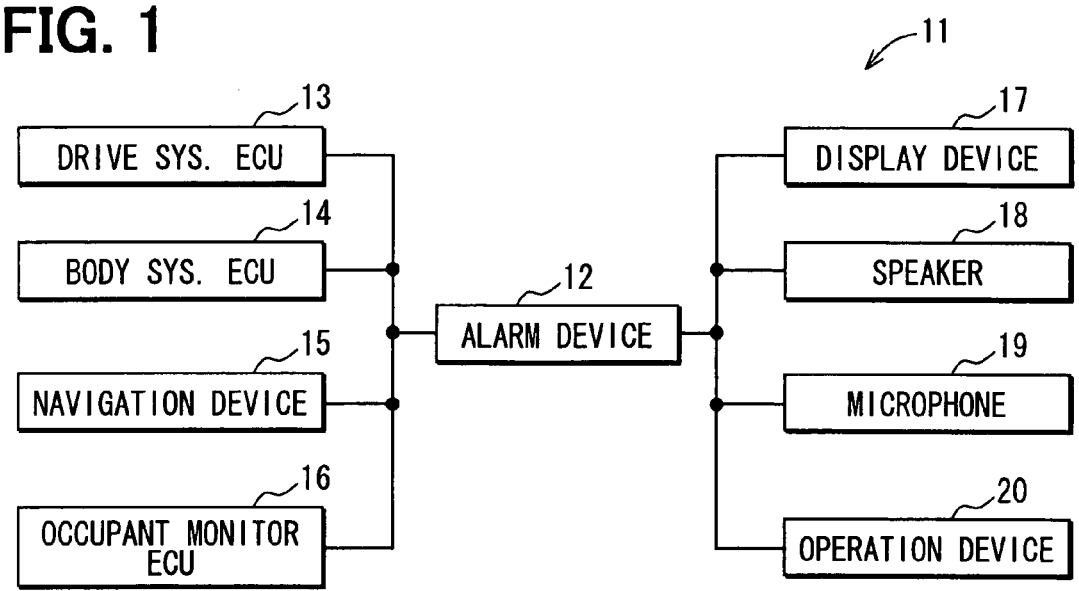
FIG. 1 is a block diagram, which shows a schematic structure of an alarm system of one embodiment of the present invention.

Hereinafter, embodiments, to which the present invention is applied, are described referring to the drawings. Note that, the mode for carrying out the present invention is not limited at all to the embodiments described below. However, various kinds of forms can be adopted as far as the mode belongs to the technical scope of the present invention.

A structure is described. An alarm system 11 of the present embodiment includes an alarm device 12, a drive system ECU 13, a body system ECU 14, a navigation device 15, an occupant monitor ECU 16, a display device 17, a speaker 18, a microphone 19 and an operation device 20, all connected to the alarm device 12, as shown in a block diagram of FIG. 1.

The alarm device 12 generates information, which should be alarmed to a user (occupant), based on information inputted from the drive system ECU 13, the body system ECU 14, the navigation device 15, the occupant monitor ECU16, the microphone 19, and the operation device 20. Then, the alarm device 12 outputs generated information through the display device 17 and the speaker 18. More information about the structure is described below.

The drive system ECU 13 is an ECU group including ECUs associated with a travel, such as an engine ECU, an AT-ECU, a brake ECU. The body system ECU14 is another ECU group including ECUs associated with vehicle equipments, such as a door lock ECU, a window ECU, an air conditioner ECU, an audio ECU.

The navigation device 15 is a widely known navigation device, and displays a geographical map of the neighborhood of a current position in the display device 17 through the alarm device 12 such that calculation of a route to the appointed destination and a route guide are performed.

The occupant monitor ECU 16 monitors information provided from a sensor installed in the seat and a camera photographing a face of the occupant. The display device 17 includes a liquid crystal panel or an organic electroluminescence panel to display the information, which has been sent from the alarm device 12. Note that, multiple display devices 17 may be provided. In that case, each of the display devices 17 may be in charge of the corresponding display contents. Also, each display device 17 may be installed in each seat.

The speaker 18 outputs sound based on the audio signal, which has been sent from the alarm device 12, and is installed in a position, which effectively enables the sound heard by, mainly, a driver (occupant). The microphone 19 receives the sound that the occupant generated, and converts the sound into an audio signal to be outputted to the alarm device 12. Thus, the microphone 19 is at a position such that the microphone 19 can effectively receives the sound of the driver.

The operation device 20 includes at least one of a mechanical key switch, a haptic device, and a gesture device, and outputs an input command (instruction), which is inputted to the operation device 20, to the alarm device 12. Typically, the haptic device provides a reaction force to the operation of the operator. The gesture device detects with a camera the physical operation performed by the operator, and recognizes the physical operation (e.g., physical movement) as the command. Note that, the operation device 20 is installed in a position, which enables the driver to operate.

Figure 2:
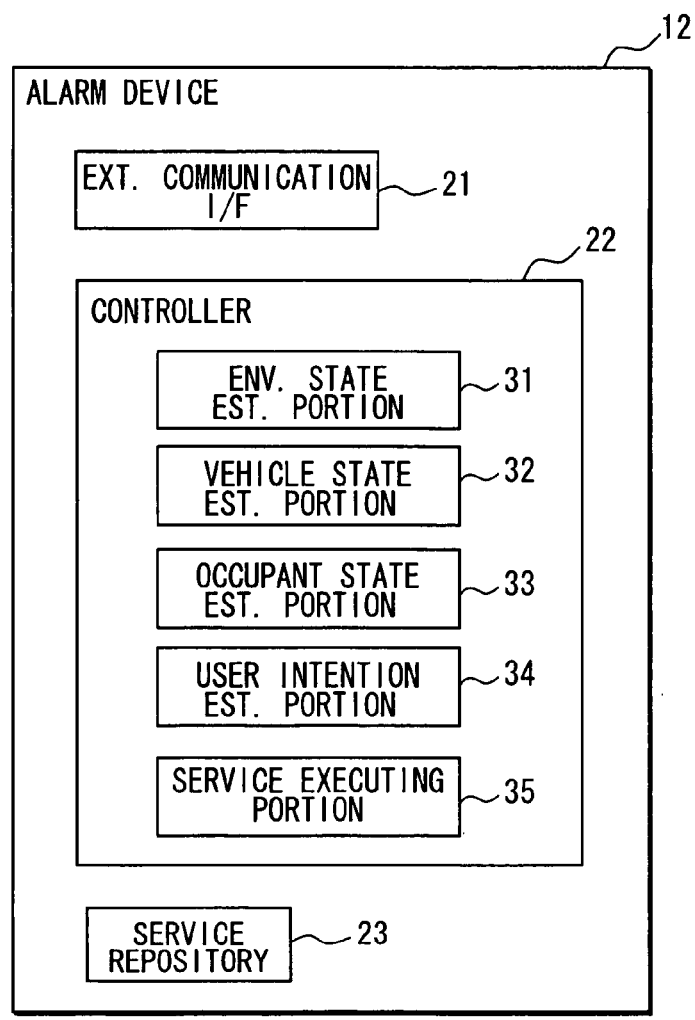
FIG. 2 is a block diagram, which shows a schematic structure of the alarm device.

The alarm device 12 is detailed using a block diagram of FIG. 2. As shown in FIG. 2, the alarm device 12 includes an external communication I/F 21, a controller 22, and a service repository 23, all connected with each other.

The external communication I/F 21 communicates with the above various ECUs, and includes a microcomputer for communication. The controller 22 includes a CPU, a ROM, a RAM, and bus, all of which logically realize an environmental state estimating portion 31, a vehicle state estimating portion 32, an occupant state estimating portion 33, a user intention estimating portion 34, and a service executing portion 35.

The environmental state estimating portion 31 estimates an environment around the vehicle based on VICS information acquired through the navigation device 15 and based on information of surroundings of the vehicle acquired from the body system ECU 14. Typically, a state of the traffic jam (delay), a state of the climate, a state of the geographical features, and a presence of the obstruction are estimated.

The vehicle state estimating portion 32 estimates a state of the vehicle based on an operational state information of, for example, an engine acquired from the drive system ECU 13 and based on an operational state information of the vehicle equipment acquired from the body system ECU 14. Typically, necessity of the fueling, necessity of the operation for closing and opening the window, a state of the air conditioning, and a state of the vehicle malfunction are estimated.

The occupant state estimating portion 33 estimates a state of the occupant based on information of an occupant acquired from occupant monitor ECU 16 (e.g., a signal from a sensor installed in the seat, image information provided from the camera, which photographs a face of the occupant). A seating state of the occupant (whether the occupant is seated or not), a consciousness level of the occupant, and a physical condition of the occupant are estimated, typically.

The user intention estimating portion 34 estimates a present action and a near future action, which will be taken by a user (occupant), based on the information from the environmental state estimating portion 31, the vehicle state estimating portion 32, the occupant state estimating portion 33, the microphone 19, and the operation device 20, and such that the user intention estimating portion 34 determines a service to be executed. The present action and the near future action include, for example, a routing, the operation for opening and closing the window, activation/deactivation of the light, adjustment of the air conditioner, and adjustment of the audio. Information (data) associated with the determined service is read from the service repository 23, and is transferred to the service executing portion 35.

The service executing portion 35 actually performs services below based on information transmitted from the user intention estimating portion 34. The services include a group of programs to provide suggestion to the user or command for the ECU. Note that, even if the execution of the service has been already started, the execution of the service may be continued as desired using information from the environmental state estimating portion 31, the vehicle state estimating portion 32, the occupant state estimating portion 33, the user intention estimating portion 34, the microphone 19, and the operation device 20.

Typically, the service repository 23 includes a flash memory to store a service table and an action table. The service table and the action table are explained using table layout patterns of FIGS. 3A and 3B.

FIG. 3A is the table layout pattern of the service table. The record of the service table includes information associated with the execution of the service. Typically, the record of the service table includes a service ID, importance, an expiration time, and a message. For example, multiple records are prepared in the service table for one estimation result made by the user intention estimating portion 34.

Data in the service ID column identifies a unique record. Data in the importance column indicates importance of the service. The expiration time (e.g., a period for which the message is valid) is an initial expiration time (default expiration time) set at the time of starting the service. Note that, the expiration time is preset depending on a content of the service such that a message outputted within the expiration time sufficiently works and such that a message outputted out of the expiration time does not work (becomes useless). Also, the expiration time is merely the initially preset expiration time as e.g., a default value. Therefore, in practice, the initial expiration time is revised to be used based on an estimation result of each estimating portion at the time of starting the service.

The message is displayed to the display device 17 during the service execution. FIG. 3B is a table layout pattern of the action tables. The record of the action table includes information associated with commands (action) to be outputted by various ECUs during the service execution. Typically, the record of the action table includes an action ID, a service ID, a target, timing, and action. For example, multiple records are prepared in the action table for one corresponding record in the above service table.

The action ID identifies a unique record. Data in the service ID column indicates a corresponding service ID. Data in the target column indicates an ECU or an apparatus serving as a target, to which the content of the action is transmitted.

Data in the timing column indicates timing for transmitting the content of the action. Data in the action column indicates the content of the action. Next, an operation of the alarm device 12 is explained by an operation example.

(1) OPERATION EXAMPLE 1

Figure 4:
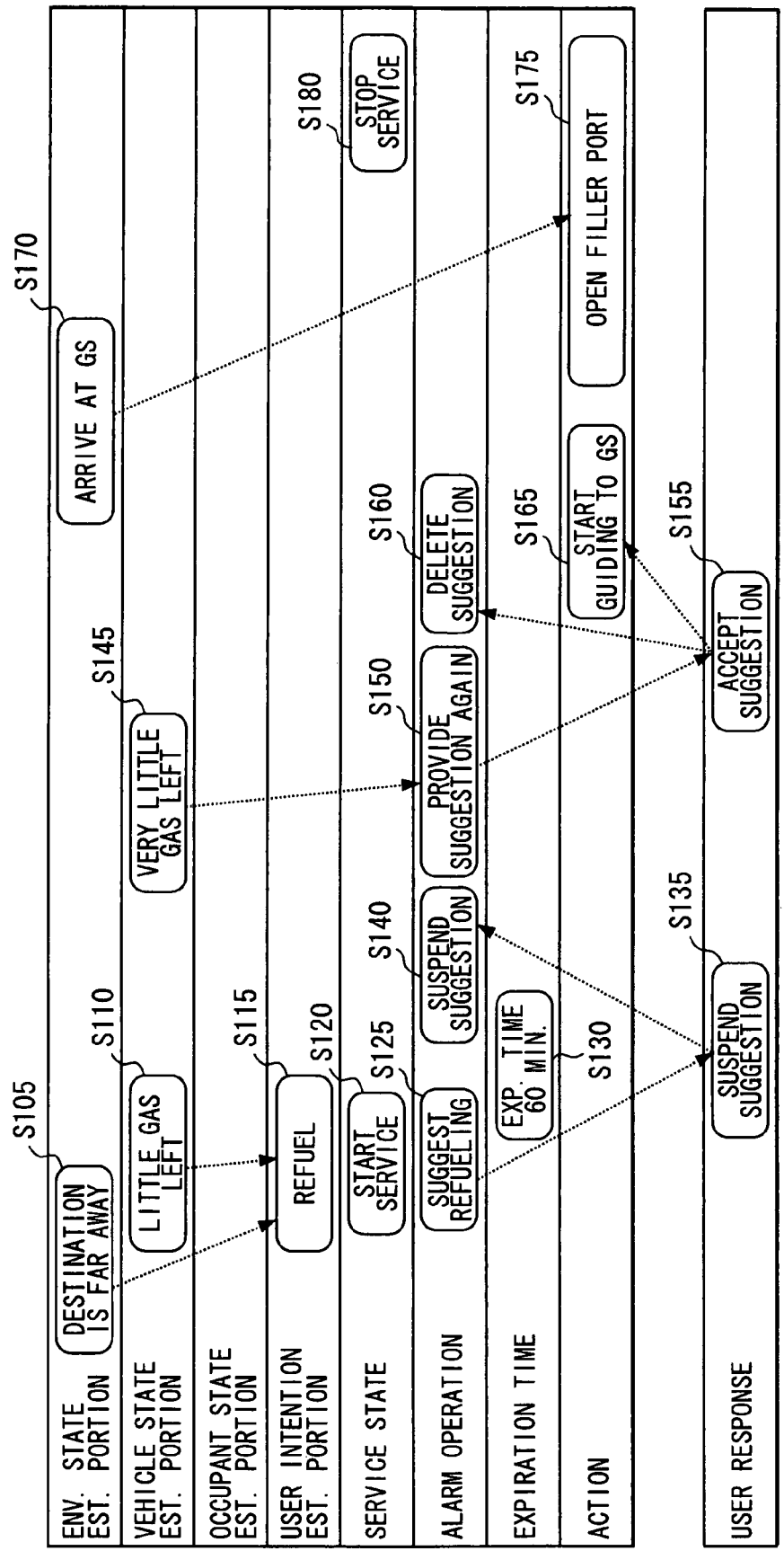
FIG. 4 is a ladder chart for explaining an operation example 1.

FIG. 4 is a ladder chart for explaining the operation example 1. In this operation example, it is assumed that the route guidance is executed by the navigation device 15. In the above assumption, in one example, the environmental state estimating portion 31 of the alarm device 12 estimates at S105 that the destination is still far away (for example, the destination is located equal to or more than 100 km away). Also, in the one example, the vehicle state estimating portion 32 of the alarm device 12 estimates at S110 that the residual quantity of the gasoline is small (for example, the quantity is equal to or less than 10 L). Then, the user intention estimating portion 34 estimates based on these estimation results at S115 that the user will fill up with gasoline (e.g., the user will refuel) in the near future. Alternatively, the user intention estimating portion 34 estimates that the user may think the user must fill up with gas in the near future.

When the user intention estimating portion 34 estimates that the user will refuel in the near future (or that the user may think the user must refuel in the near future), the user intention estimating portion 34 searches the service table and the action table for corresponding record. Then, the user intention estimating portion 34 transmits all the information of the corresponding record to the service executing portion 35. Note that, at this time, the value of the expiration time defined by the record of the service table may be revised (corrected) as necessary based on the estimation results of the environmental state estimating portion 31 and the vehicle state estimating portion 32. Then, the corrected expiration time is transmitted to the service executing portion 35 (in this operation example, the expiration time is 60 minutes). Then, the service executing portion 35 starts a service based on the transmitted information at S120. When starting the service, the service executing portion 35 makes the display device 17 display a visual message (suggestion) of "there is a small amount of gasoline left. Need to look for a gasoline station?" at S125 (e.g., the service executing portion 35 causes the display device 17 to display the massage so as to inform the occupant of the alarm information). Along with this, the service executing portion 35 makes the audible sound corresponding to the visual message outputted from the speaker 18 at S125. Then, the service executing portion 35 recognizes the expiration time of the suggestion as 60 minutes at S130.

When the user performs a suspension operation for suspending the suggestion to the operation device 20 at S135, the service executing portion 35 suspends the suggestion (e.g., the service executing portion 35 makes the suggestion at a suspended state) at S140. Typically, the message displayed to the display device 17 is erased, and the sound output is stopped. Thus, the service executing portion 35 temporally stops the display device 17 from informing the occupant of the alarm information.

Afterwards, for example, time elapses within the remaining time of the expiration time recognized in S130. Then, the vehicle state estimating portion 32 estimates that the residual quantity of the gasoline is very small (for example, equal to or less than 5 L) at S145. When the service executing portion 35 receives the estimation result at S150, the service executing portion 35 provides the above suggestion again, which has been suspended (in the suspended state).

When the user performs an operation for accepting the suggestion to the operation device 20 at S155, Then, the service executing portion 35 deletes (cancels) the above suggestion (e.g., the message displayed to the display device 17 is erased, and the sound output is stopped) at S160. Along with it, the service executing portion 35 outputs a command for the navigation device 15 at S165 such that the navigation device 15 calculates and guides a route to the nearest gasoline station (GS). When the navigation device 15 receives the command, the navigation device 15 temporarily stops the route guidance to the destination, and the navigation device 15 calculates the route to the nearest gasoline station, and starts the guidance.

Afterwards, time passes within the remaining time of the expiration time recognized at S130. For example, the environmental state estimating portion 31 estimates that the vehicle arrived at the gasoline station at S170. When the service executing portion 35 receives the estimating result, the service executing portion 35 performs the content of the record of the action table, which has been already received from user intention estimating portion 34. Typically, commands (e.g., a command for opening an oil filler port, a command for unlocking a door lock of the driver seat, a command for turning off the light if head light illuminates) are outputted to the corresponding ECUs at S175. At S180, the service executing portion 35 stops the service that is started at S120.

As explained above, in the alarm system 11 of the present embodiment, the suggestion from the alarm device 12 is suspended (in the suspended state) based on the intention of the user at S135. Thus, the timing for determining whether or not accepting the suggestion can be put off apparently, and therefore this provides a user friendly operation.

Also, when the vehicle state estimating portion 32 estimates that the residual quantity of the gasoline is very small, the suspended state of the suggestion is removed (e.g., the temporal stopping of the alarming means from informing the occupant of the alarm information is cancelled), and the suggestion is adapted to be provided again at S150. Thus, the alarm system 11 of the present embodiment can properly transmit the suggestion content to the user depending on the change of the state.

(2) OPERATION EXAMPLE 2

Figure 5:
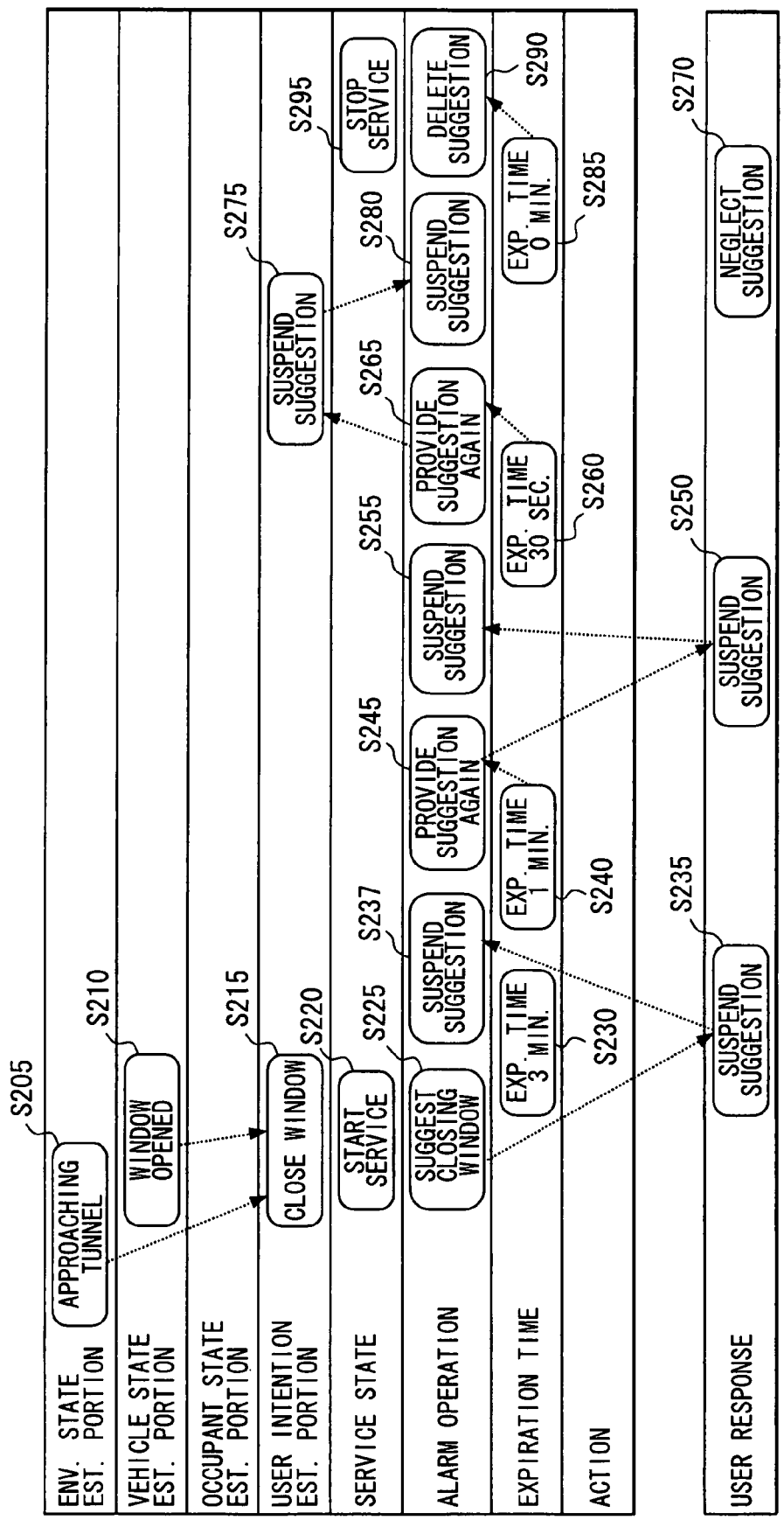
FIG. 5 is a ladder chart for explaining an operation example 2.

Next, operation example 2 is explained using a ladder chart of FIG. 5. For example, the environmental state estimating portion 31 of the alarm device 12 estimates that the vehicle comes close to (is approaching) a tunnel (e.g., 3 km to the tunnel) at S205. Also, the vehicle state estimating portion 32 of the alarm device 12 estimates at S210 that one of the windows of the vehicle opens. Then, from these estimation results, the user intention estimating portion 34 estimates at S215 that the user performs an operation for closing the opened window in the near future. Alternatively, the user intention estimating portion 34 may estimate at S215 that the user may think the user must perform the operation for closing the opened window in the near future.

When the user intention estimating portion 34 estimates that the user performs (or, the user may think the user must perform) the operation for closing the opened window in the near future, the user intention estimating portion 34 searches the service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (in this operation example, the expiration time is three minutes). Then, at S220, the service executing portion 35 starts a service based on the received information. At the start of the service, at S225, the service executing portion 35 lets the display device 17 display a visual message (suggestion) "The vehicle is approaching a tunnel. Need to close a window?", and lets the speaker 18 output the audible sound equivalent to the visual message. Then, at S230, the service executing portion 35 recognizes the expiration time of the suggestion as three minutes.

When the user performs an operation for suspending the suggestion to the operation device 20 at S235, the service executing portion 35 makes the suggestion at a suspended state at S237 (e.g., the service executing portion 35 suspends the suggestion). Typically, the service executing portion 35 erases the message that has been displayed by the display device 17, and also stops the sound output.

Afterwards, when one minute of the expiration time is left at S240 after a certain time has elapsed, at S245, the service executing portion 35 provides the suggestion again, which has been suspended. If the user performs the operation to suspend the suggestion to the operation device 20 at S250, the service executing portion 35 suspends the suggestion again at S255.

Afterwards, when 30 seconds of the expiration time is left at S260 after a certain time has elapsed, at S265, the service executing portion 35 provides the suggestion again, which has been suspended. When the user ignores this at S270, the service executing portion 35 estimates that the user intends the suspension of the suggestion at S275, and suspends the suggestion again at S280.

Afterwards, when 0 minute of the expiration time is left at S285 after a certain time has elapsed, at S290, the service executing portion 35 deletes (cancel) the suggestion (i.e., the service executing portion 35 erases the message, which the display device 17 has been made to display, and stops the sound output). Also, at S295, the service executing portion 35 stops the service, which is started at S220.

The operation example 2 is explained as above. According to the alarm system 11 of the present embodiment, as long as the expiration time is valid, the suggestion is provided (S245, S265). Therefore, the expired alarm information (expired suggestion) is limited from being kept provided. In other words, according to the alarm system 11 of the present embodiment, the alarm information, which has became useless, is limited from being kept provided for alarm.

Also, the alarm system 11 of the present embodiment automatically provides the suggestion again in response to the remaining time of the expiration time (S245, S265). Therefore, this limits the user from forgetting about suspension of the suggestion, and therefore limits the expiration time from becoming invalid in a state, where the suggestion is not provided again. In one embodiment, "in response to the remaining time of the expiration time" means a case, where the remaining time of the expiration time becomes less than a predetermined time. In another embodiment, this means a case, where the remaining time of the expiration time becomes less than a time, which corresponds to a predetermined ratio of the determined expiration time. Also, in another embodiment, this means a case, where the remaining time of the expiration time becomes zero.

Also, as for the alarm system 11 of the present embodiment, the expiration time is set first as three minutes, and the alarm system 11 is adapted to automatically cancel the suspended state of the suggestion at predetermined timing to provide the suggestion again (S245, S265). The predetermined timing includes (a) timing, at which the remaining time of the expiration time becomes one minute (i.e., at which two minutes has elapsed since the previous suggestion) and (b) timing, at which the remaining time of the expiration time becomes 30 seconds (i.e., at which 30 seconds has elapsed since the previous suggestion). Thus, as the remaining time of the expiration time decreases, an interval of the provision of the suggestion again is shortened. As a result, the user knows beforehand that expiration of the expiration time is coming soon (e.g., that the expiration time is becoming invalid).

(3) OPERATION EXAMPLE 3

Figure 6:
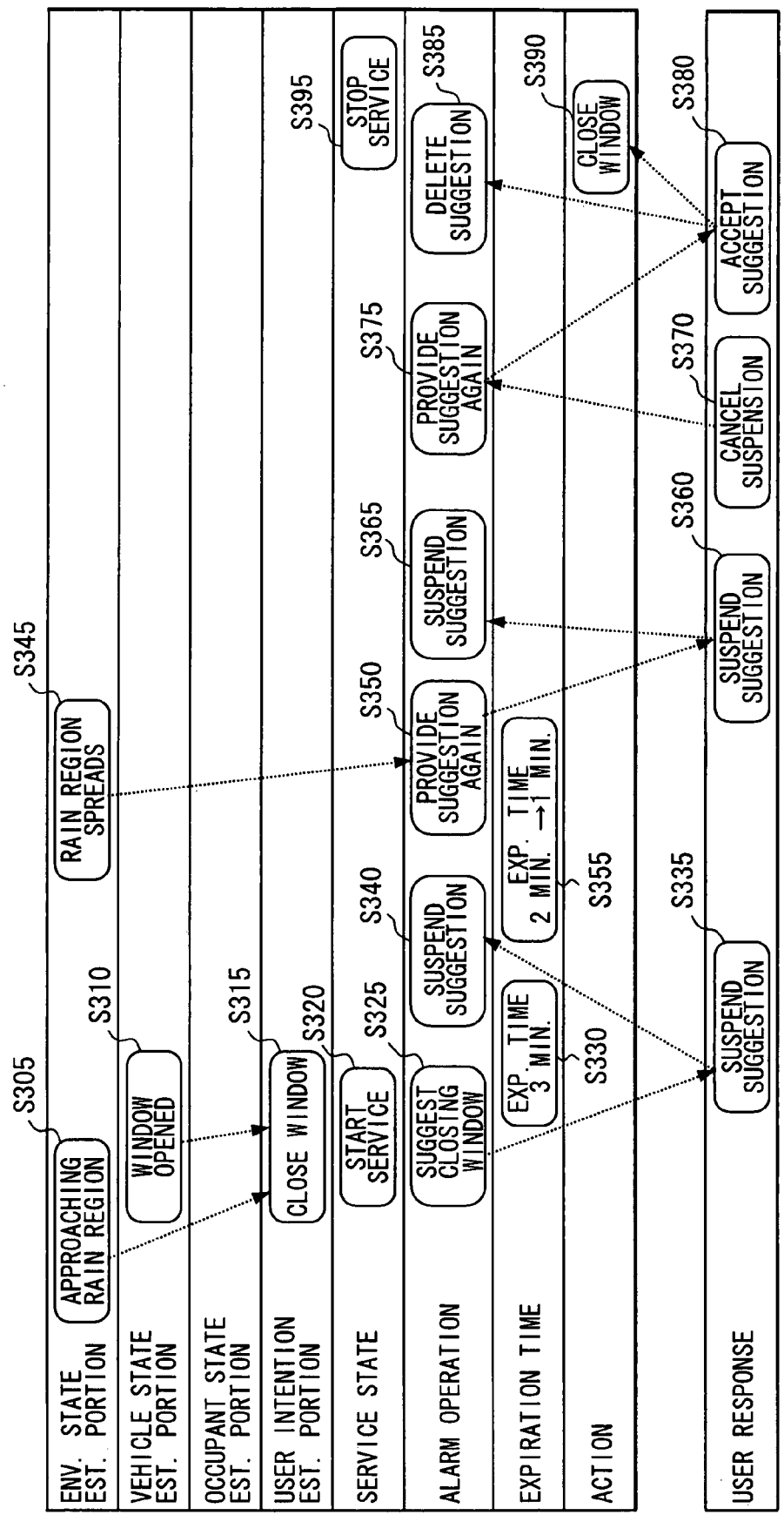
FIG. 6 is a ladder chart for explaining an operation example 3.

Next, the operation example 3 is explained using a ladder chart of FIG. 6. For example, the environmental state estimating portion 31 of the alarm device 12 estimates that the vehicle approaches a rainfall region (e.g., 3 km to the rainfall region) at S305. Also, for example, the vehicle state estimating portion 32 of the alarm device 12 estimates that one of windows of the vehicle opens at S310. Then, from these estimation result, the user intention estimating portion 34 estimates at S315 that the user performs an operation for closing the opened window in the near future. Alternatively, the user intention estimating portion 34 may estimate at S315 that the user thinks the user must perform the operation for closing the opened window in the near future.

When the user intention estimating portion 34 estimates that the user performs (or, the user may think the user must perform) the operation for closing the opened window in the near future, the user intention estimating portion 34 searches service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (in this operation example, the expiration time is three minutes). Then, at S320, the service executing portion 35 starts a service based on the received information. Upon the start of the service, the service executing portion 35 makes the display device 17 display a message "It will be rainy ahead. Need to close a window?", and makes the sound corresponding to the message content outputted from the speaker 18 at S325. Then, the service executing portion 35 recognizes the expiration time of the suggestion as three minutes at S330.

For example, when the user performs the operation for suspending the suggestion to the operation device 20 at S335, the service executing portion 35 suspends the suggestion at S340. Typically, the message, which the display device 17 is made to display, is erased, and the sound output is stopped.

Afterwards, for example, the environmental state estimating portion 31 estimates at S345 that the rainfall region spreads, and thereby the vehicle arrives at the rainfall region earlier. When the service executing portion 35 receives the estimation result at S350, the service executing portion 35 provides the suggestion again, which has been suspended. Also, the expiration time recognized at S330 is shortened at S355. Typically, if the remaining time of the expiration time is more than one minute (e.g., two minutes), this remaining time is forcibly made to be one minute.

When the user performs the operation for suspending the suggestion to the operation device 20 at S360, the service executing portion 35 suspends the suggestion again at S365.

Afterwards, for example, when time passes (within the remaining time of the expiration time) and the user performs an operation for canceling the suspension to the operation device 20 at S370, the service executing portion 35 cancels the suspension of the suggestion, and provides (offers) the suggestion again at S375.

For example, when the user performs an operation for accepting the suggestion to the operation device 20 at S380, the service executing portion 35 deletes (cancels) the suggestion (e.g., the service executing portion 35 erases the message that is displayed by the display device 17, and stops the sound output) at S385. Along with it, the service executing portion 35 outputs a command for closing all the opened windows to the corresponding ECU at S390. Then, at S395, the service executing portion 35 stops the service that started in S320.

The operation example 3 is explained as above. With the alarm system 11 of the present embodiment, when the user performs the operation for canceling the suspension to the operation device 20, the suspension is cancelled as long as the expiration time is valid such that the suggestion is provided again (S370, S375). Thus, this limits the suggestion of an expired (invalid) expiration time from being provided, and controls the operation for providing the suggestion again based on the intention of the user. Thus, this is convenient. As above, when the suggestion (alarm information) requires a response (intention) of the occupant (user) and also when the acceptance of the occupant response works with the suggestion, the occupant can effectively suspend the suggestion. Thus, this is very convenient for the occupant (user).

Also, when the environmental state estimating portion 31 estimates that the rainfall region spreads, and therefore that the vehicle arrives at the rainfall region earlier, the suggestion is provided again based on the above estimation (S350). Also, the expiration time is shortened at S355. Thus, the appropriate alarm operation depending on the environmental variation is performed.

(4) OPERATION EXAMPLE 4

Figure 7:
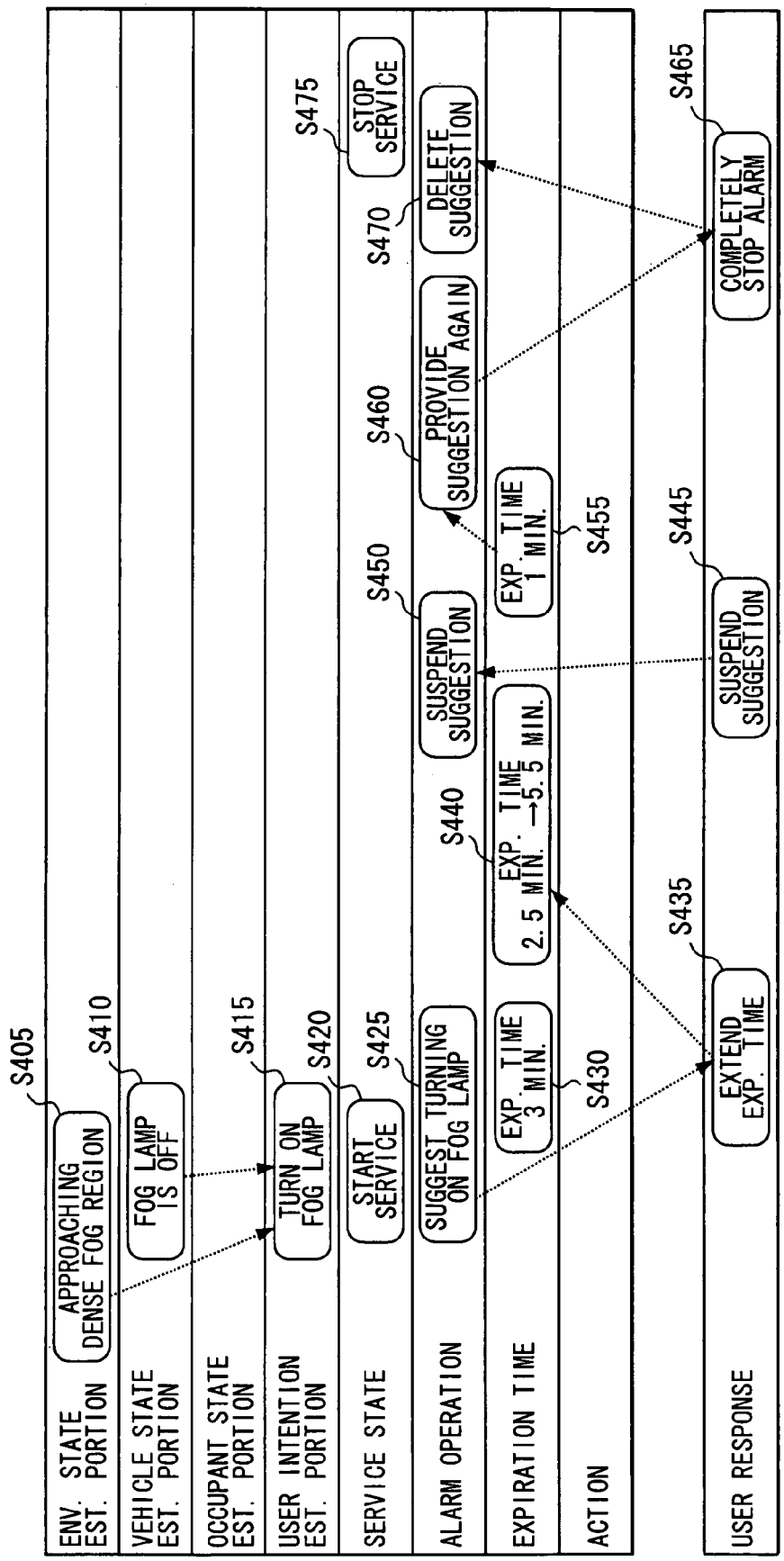
FIG. 7 is a ladder chart for explaining an operation example 4.

Next, the operation example 4 is explained using a ladder chart of FIG. 7. For example, the environmental state estimating portion 31 of the alarm device 12 estimates at S405 that the vehicle approaches the dense fog region (e.g., 3 km to the dense fog region). Also, the vehicle state estimating portion 32 of the alarm device 12 estimates at S410 that a fog lamp of the vehicle is turned off. Then, from these estimation results, the user intention estimating portion 34 estimates at S415 that the user will perform (or, the user may think that the user must perform) an operation for turning on (activating) a fog lamp in the near future.

When the user intention estimating portion 34 estimates that the user will perform (or thinks that the user must perform) the operation for turning on the fog lamp in the near future, the user intention estimating portion 34 searches the service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (the expiration time is three minutes in this operation example). Then, the service executing portion 35 starts a service based on the received information at S420. Upon the start of the service, the service executing portion 35 makes the display device 17 display a message "Dense fog occurs ahead. Need to turn on the fog lamp?", and makes the speaker 18 output the sound corresponding to the content at S425. Also, at S430, the service executing portion 35 recognizes the expiration time of the suggestion as three minutes.

For example, the user may want to determine the activation (turning on) of the fog lamp once after the user has encountered the dense fog, and therefore the user wants to extend the expiration time of the suggestion. Thus, the user performs an operation for the above intention to the operation device 20 at S435. Then, at S440, the service executing portion 35 extends the expiration time, which is recognized at S430. Typically, in an example case, where the remaining time of the expiration time is 2 minutes 30 seconds, three minutes are added to the remaining time so that the remaining time of the expiration time becomes 5 minutes 30 seconds.

Further still, for example, when the user performs the operation for suspending the suggestion to the operation device 20 at S445, the service executing portion 35 suspends the suggestion at S450. Typically, the service executing portion 35 erases the message that the display device 17 has been made to display, and stops the sound output.

Afterwards, when time passes, and the remaining time of the expiration time becomes one minute at S455, the service executing portion 35 provides at S460 the suggestion again, which has been suspended. When the user performs an operation, which indicates that the alarm is unnecessary after this (e.g., in the future), to the operation device 20 at S465, the service executing portion 35 cancels (e.g., erases, deletes) the suggestion (e.g., the message that the display device 17 has been made to display is erased, and the sound output is stopped) at S470. At S475, the service executing portion 35 stops the service that was started at S420.

The operation example 4 is explained as above. With the alarm system 11 of the present embodiment, when the user wanted to extend the expiration time of the suggestion, this can be realized (S435, S440). Thus, the intention of the user can be reflected to the expiration time, and therefore the convenience of the alarm system 11 improves as a result.

Also, when the user thinks that the alarm (e.g., provision of the suggestion) after this (e.g., in the future) is unnecessary, this can be realized at S465, S470. Thus, the intention of the user can be reflected in whether the suggestion is provided again or not. As a result, the convenience of the alarm system 11 improves. As above, when the user thinks that the alarm information (suggestion) is not required to be informed in the future, the alarming means (e.g., the display device 17) is completely stopped from displaying the alarm information (suggestion, message) to inform the user of the alarm information regardless of a validity (e.g., a remaining time) of the expiration time of the alarm information. Here, when the alarming means is completely stopped from displaying the alarming information, the alarming means is put in a condition, where the alarming means cannot continue displaying nor restart displaying the information such that the alarming means cannot inform the user of the alarm information in the future.

(5) OPERATION EXAMPLE 5

Figure 8:
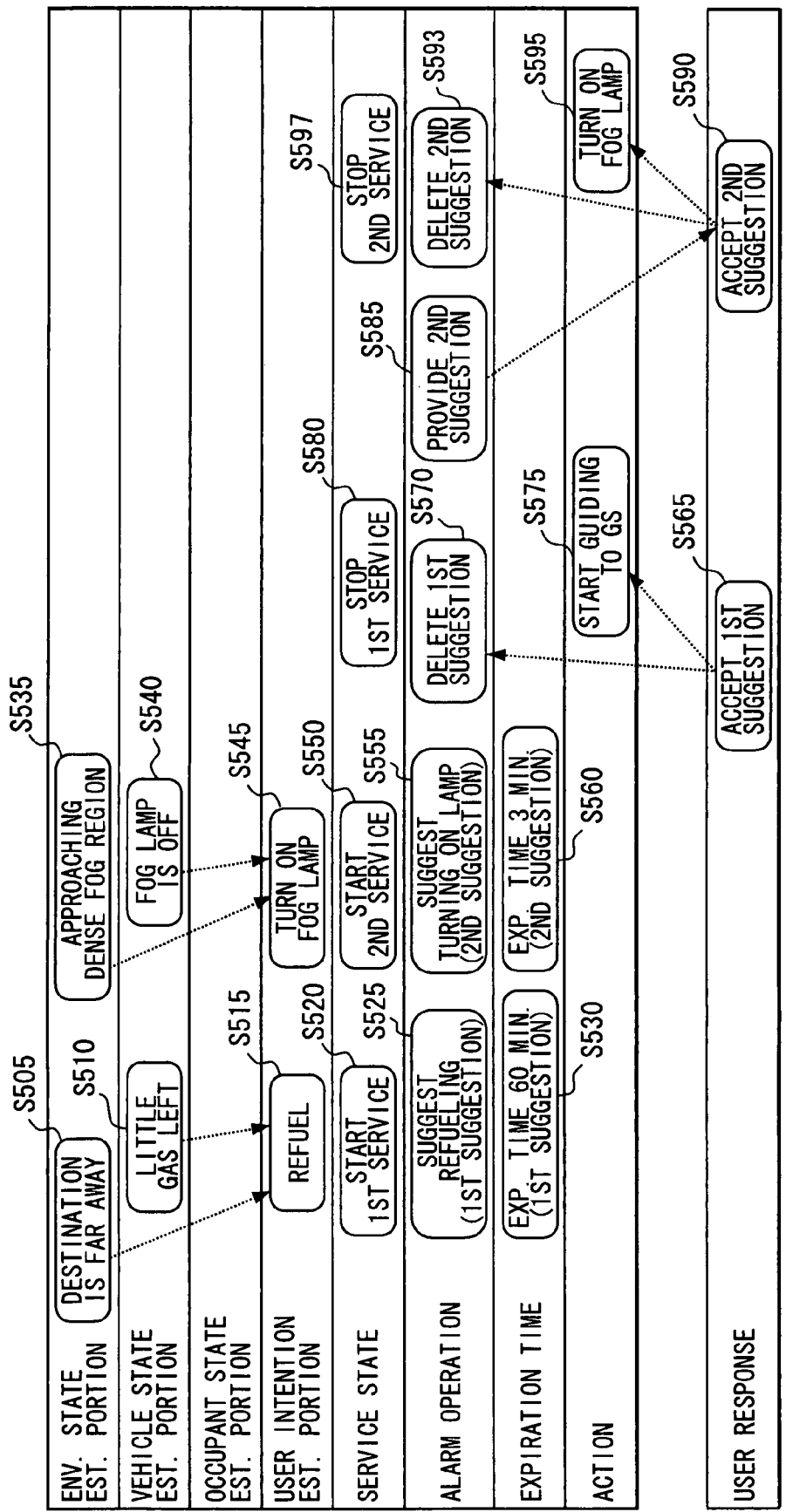
FIG. 8 is a ladder chart for explaining an operation example 5.

Next, the operation example 5 is explained using a ladder chart of FIG. 8. In this operation example, route guidance is assumed to be executed by the navigation device 15. In the above assumption, for example, the environmental state estimating portion 31 of the alarm device 12 estimates that the destination is still far away (e.g., there is more than 100 km) at S505. Also, the vehicle state estimating portion 32 of the alarm device 12 estimates that the residual quantity of the gasoline is small (e.g., equal to or less than 10 L) at S510. Then, from these estimation results, the user intention estimating portion 34 estimates at S515 that the user will refuel (or the user may think that the user must refuel) in the near future. When the user intention estimating portion 34 estimates that the user will refuel in the near future (that the user may think that the user must refuel in the near future), the user intention estimating portion 34 searches the service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (the expiration time is 60 minutes in this operation example). Then, the service executing portion 35 starts a service based on the received information at S520. By starting the service, the service executing portion 35 makes (lets) the display device 17 display a message (suggestion) of "there is a small amount of gasoline left. Look for a gasoline station?", and makes the speaker 18 output the sound corresponding to the content at S525. Then, the service executing portion 35 recognizes the expiration time of the above suggestion (referred as the first suggestion) for the first service as 60 minutes at S530.

Then, for example, the environmental state estimating portion 31 estimates that the vehicle is approaching a rainfall region (e.g., 3 km to the rainfall region) at S535. Also, the vehicle state estimating portion 32 of the alarm device 12 estimates at S540 that a fog lamp of the vehicle is turned off. Then, from these estimation results, the user intention estimating portion 34 estimates at S545 that the user will perform (or, the user may think that the user must perform) an operation for turning on the fog lamp in the near future.

When the user intention estimating portion 34 estimates that the user will perform (or may think that the user must perform) the operation for turning on the fog lamp in the near future, the user intention estimating portion 34 searches the service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (the expiration time is three minutes in this operation example). Then, the service executing portion 35 starts a second service based on the received information at S550. A suggestion (second suggestion) by the second service is to make the display device 17 display a visual message "Dense fog occurs ahead. Need to turn on the fog lamp?", and is to make the speaker 18 output the sound corresponding to the visual message. However, the first service, which is already started at S520, is being suggested by the first suggestion to the user now. Therefore, at S555, the service executing portion 35 suspends the second suggestion provided by the second service, which is started at S550, and does not performs the second suggestion. Note that, the service executing portion 35 recognizes the expiration time of the second suggestion as three minutes at S560.

Then, for example, when the user performs an operation for accepting the first suggestion to the operation device 20 at S565, the service executing portion 35 deletes (cancel) the first suggestion (i.e., the service executing portion 35 erases the message, which the display device 17 has been made to display, and stops the sound output) at S570. Along with it, the service executing portion 35 outputs a command for the navigation device 15 at S575 such that the navigation device 15 calculates and guides a route to the nearest gasoline station. The navigation device 15, which receives the command, temporarily stops the route guidance to the destination, and the navigation device 15 calculates the route to the nearest gasoline station to restart the guidance. Note that, explanation of the process (described in the operation example 1) after the arrival to the gasoline station is omitted here.

After the service executing portion 35 cancels (deletes) the first suggestion, at S580, the service executing portion 35 stops the service, which is started at S520. Immediately after this, the service executing portion 35 provides the second suggestion at S585. The second suggestion is to make the display device 17 display a message "Dense fog occurs ahead. Need to turn on the fog lamp?", and is to make the speaker 18 output the sound corresponding to the message.

When the user performs an operation for accepting the second suggestion to the operation device 20 at S590, the service executing portion 35 deletes (cancel) the second suggestion (i.e., the service executing portion 35 erases the message, which the display device 17 has been made to display, and stops the sound output) at S593. Along with it, the service executing portion 35 outputs a command for turning on the fog lamp to a corresponding ECU at S595. Then, at S597, the service executing portion 35 stops the second service that is started at S550.

The operation example 5 is explained as above. With the alarm system 11 of the present embodiment, in a case, where the second suggestion becomes ready to be provided while the first suggestion is operated, the second suggestion is suspended (S555). Then, after the first suggestion is deleted (cancelled), the second suggestion is adapted to be provided (S585). In other words, while the alarm information (first suggestion), which is currently informed to the occupant (user) is kept informed, the another alarm information (the second suggestion) is given an opportunity to be informed to the occupant. Thus, the visibility of the suggested information for the user is limited from degrading, and also multiple suggestions can be provided as the alarm.

(6) OPERATION EXAMPLE 6

Figure 9:
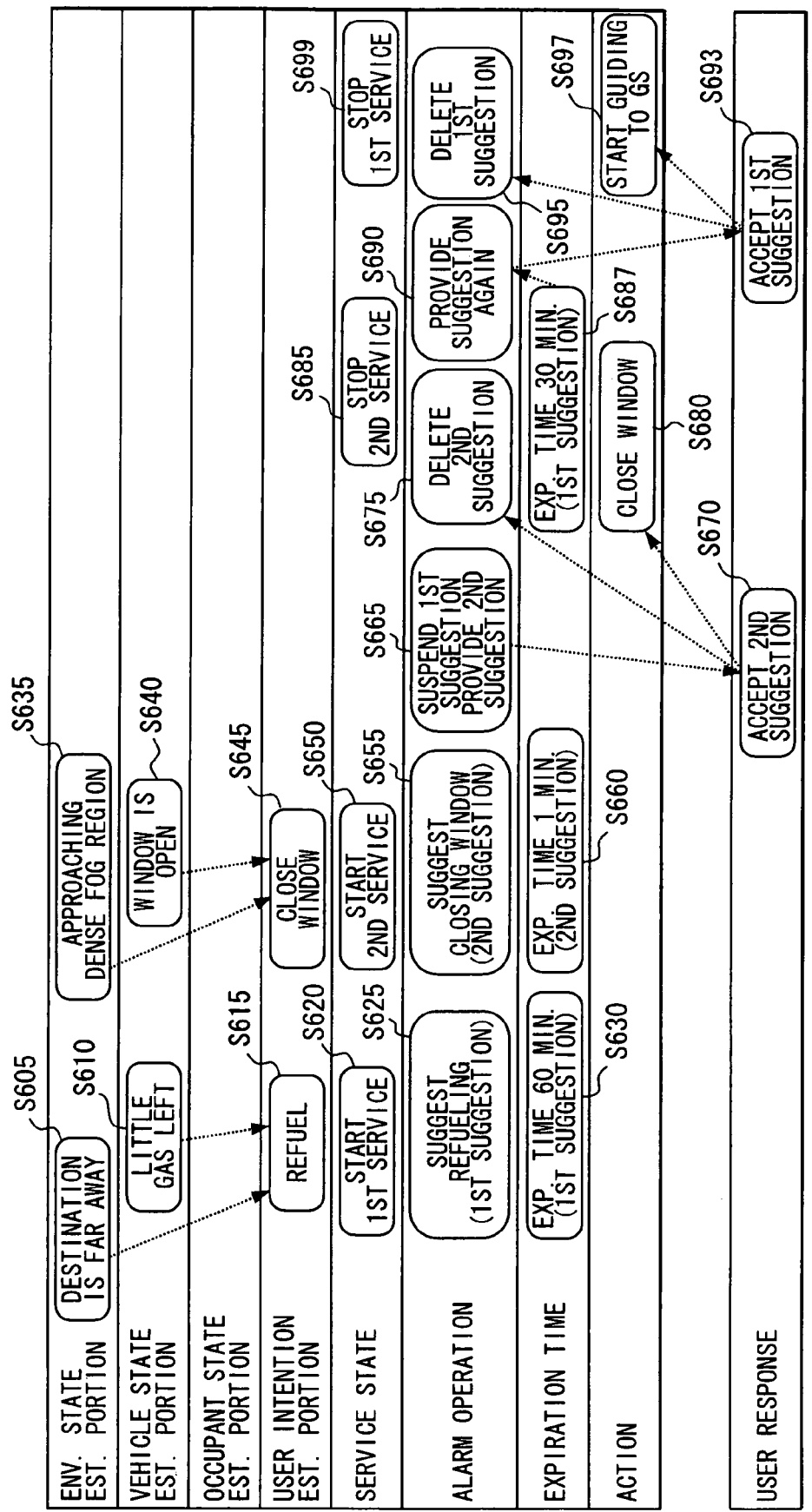
FIG. 9 is a ladder chart for explaining an operation example 6.

Next, the operation example 6 is explained using a ladder chart of FIG. 9. In this operation example, route guidance is assumed to be executed by the navigation device 15. In the above assumption, for example, the environmental state estimating portion 31 of the alarm device 12 estimates at S605 that the destination is still far away (e.g., there is more than 100 km to the destination). In the one example, the vehicle state estimating portion 32 of the alarm device 12 estimates that the residual quantity of the gasoline is small (for example, it is equal to or less than 20 L) at S610. Then, from these estimation results, the user intention estimating portion 34 estimates at S615 that the user will refuel (or the user may think that the user must refuel) in the near future.

When the user intention estimating portion 34 estimates that the user will refuel in the near future (that the user may think the user must refuel in the near future), the user intention estimating portion 34 searches the service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (the expiration time is 60 minutes in this operation example). Then, the service executing portion 35 starts a first service based on the received information at S620. By starting the first service, the service executing portion 35 makes (lets) the display device 17 display a visual message (suggestion) of "There is a small amount of gasoline left. Look for a gasoline station?", and makes the speaker 18 output the sound corresponding to the visual massage at S625. Then, the service executing portion 35 recognizes the expiration time of the suggestion (referred as the first suggestion for the first service) as 60 minutes at S630.

Then, for example, the environmental state estimating portion 31 estimates at S635 that the vehicle is approaching a rainfall region (e.g., 3 km to the rainfall region). Also, for example, the vehicle state estimating portion 32 of the alarm device 12 estimates at S640 that one of windows of the vehicle opens. Then, from these estimation result, the user intention estimating portion 34 estimates at S645 that the user performs (or, the user may think the user must perform) the operation for closing the opened window in the near future.

When the user intention estimating portion 34 estimates that the user will perform (or may think that the user must perform) the operation for closing the windows in the near future, the user intention estimating portion 34 searches the service table and the action table for the corresponding record, and transmits all the information of the corresponding record to the service executing portion 35. Note that, at this time, the value of the expiration time defined by the record of the service table may be corrected as necessary based on the estimation results of the environmental state estimating portion 31 and the vehicle state estimating portion 32. Then, the corrected expiration time is sent to the service executing portion 35 (the expiration time is one minute in this operation example). Then, the service executing portion 35 starts a second service based on the received information at S650. A second suggestion by the second service is to make (let) the display device 17 display a visual message (suggestion) of "It will be raining ahead. Need to close the windows?", and is to make the speaker 18 output the audible sound corresponding to the visual message. However, the first service, which is already started at S620, is being suggested to the user now. Therefore, at S655, the service executing portion 35 suspends the second service started at S650. Note that, the service executing portion 35 recognizes the expiration time of the second suggestion as three minutes at S660.

Immediately after this, the service executing portion 35 compares the remaining time of the expiration time of the first suggestion with that of the second suggestion. Then, the service executing portion 35 suspends the suggestion with a long remaining time, and provides (offers) the suggestion with a short remaining time. In other words, the service executing portion 35 suspends the first suggestion and provides the second suggestion at S665.

For example, at S670, the user performs an operation for accepting the second suggestion to the operation device 20. Then, the service executing portion 35 deletes (cancel) the second suggestion (i.e., the service executing portion 35 erases the message, which the display device 17 has been made to display, and stops the sound output) at S675. Along with it, the service executing portion 35 outputs a command for closing all the opened windows to the corresponding ECU at S680. Then, at S685, the service executing portion 35 stops the second service that is started at S650.

Afterwards, when time passes, and the remaining time of the expiration time becomes 30 minute at S678, the service executing portion 35 provides the first suggestion again, which has been suspended, at S690.

Then, for example, the user performs an operation for accepting the first suggestion to the operation device 20 at S693. Then, the service executing portion 35 deletes (cancels) the first suggestion (i.e., the service executing portion 35 erases the message, which the display device 17 has been made to display, and stops the sound output) at S695. Along with it, the service executing portion 35 outputs a command for the navigation device 15 at S697 such that the navigation device 15 calculates and guides a route to the nearest gasoline station. When the navigation device 15 receives the command, the navigation device 15 temporarily stops the route guidance to the destination, and the navigation device 15 calculates the route to the nearest gasoline station to restart the guidance. Note that, explanation of the process after the arrival to the gasoline station is omitted here because the process is described in the Operation Example 1.

After the service executing portion 35 cancels (deletes) the first suggestion, at S699, the service executing portion 35 stops the first service, which is started at S620.

The operation example 6 is explained as above. With the alarm system 11 of the present embodiment, in a case, where the second suggestion becomes ready to be provided while the first suggestion is provided, the remaining time of the expiration time of the first suggestion is compared with the remaining time of the expiration time of the second suggestion. The alarm system 11 of the present embodiment is designed such that the suggestion with the shorter remaining time (i.e., the second suggestion) is provided, and the suggestion with the longer remaining time (i.e., the first suggestion) is suspended at S665. Thus, this limits the expiration time from becoming invalid in a state, where the suggestion with the short expiration time is not provided, and where the suggestion with the short expiration time remains suspended.

The external communication I/F 21 is equivalent to state information obtaining means and alarm information obtaining means. Also, the controller 22 is equivalent to controlling means. Also, in the above embodiments, the display device 17 and the speaker 18 are separate structures from the alarm device 12 for convenience. However, the three components may be alternatively one structure. In this alternative case, the display device 17 and the speaker 18 correspond to alarming means. Also, in the above embodiments, the operation device 20 is a separate device from the alarm device 12 for convenience. However, they may be alternatively one structure. The operation device 20 in the alternative case is equivalent to instruction receiving means.

Also, the messages, which the display device 17 is made display, and the messages, which the speaker 18 is made output through sound, are equivalent to alarm information.

Other Embodiments (1) In the above embodiment (the operation example 6), when multiple suggestions are simultaneously provided, it is determined which suggestion to provide and which suggestion to suspend depending on the remaining time of the expiration time of the corresponding suggestion. Alternatively, the above decision may be made by comparing the importance corresponding to each service stored in the service table. Typically, the suggestion of a service with higher importance is provided, and the suggestion of a service with lower importance is suspended.

In this way, suggestion can be provided appropriately.

(2) When multiple suggestions are provided simultaneously, the provided suggestion and the suspended suggestion are periodically alternately provided in accordance with the remaining time of the expiration time of each suggestion. This is explained referring to the operation example 5, for example. In the operation example 5, in a case, where the second suggestion becomes ready to be provided while the first suggestion is provided, the second suggestion is temporally suspended. Then, after the first suggestion was deleted (cancelled), the second suggestion is adapted to be provided. In a case, where the second suggestion is suspended while the first suggestion is provided, each of the suggestions is provided periodically depending on the remaining time of the expiration time. In one example, the first suggestion is provided every 10 minutes, and the second suggestion is provided every one minute. At the time of providing one of the suggestions, the other one of the suggestions is suspended. In this way, the controlling means causes the alarming means (the display device 17, the speaker 18) to periodically alternately inform the occupant of the alarm information (first suggestion) and the another alarm information (second suggestion) based on the remaining time of the corresponding one of the expiration time and the another expiration time.

In the above structure, the suggestion is limited from expiring (e.g., from becoming invalid) in a state, where the suggestion has not been provided. Also, the user can tell that the suggestion, which is provided frequently, is a suggestion having a little remaining time of the expiration time.

(3) As described above, the operation device 20 includes at least one of the mechanical key switch, the haptic device, and the gesture device. When the operation device 20 includes the gesture device in particular, the intention of the user can be determined in a manner below. For example, in one case, where the user nodded, in another case, where the user winked, or in another case, where the user makes a predetermined shape by hand (a shape of a circle made by a thumb and a forefinger), the operation device 20 is adapted to determine that the user shows intention to accept the provided suggestion. Also, in one case, where the user puts a palm in front of its face for a certain period, or in another case, where the user upwardly turns its face (e.g., the user looks up), the operation device 20 is adapted to determine that the user shows intention to suspend the provided suggestion. Also, for example, in one case, where the user shakes its head left and right, and in another case, where the user reciprocates one hand left and right with the thumb facing toward the face, the operation device 20 is adapted to determine that the user shows intention to reject the provided suggestion.

In the above structure, even if the user does not know positions of switches for indicating each of the above intentions, the intention (e.g., reaction, answer, replay) to the provided suggestion can be easily and naturally shown.

(4) In the operation example 2, for example, the vehicle may change a travel direction in a situation, where the remaining time of the expiration time becomes one minute at S260. Consequently, the environmental state estimating portion 31 estimates that the vehicle travels away from the tunnel. In this case, the environmental state estimating portion 31 transmits the information (e.g. estimation result) to the service executing portion 35. Then, the service executing portion 35 may be adapted to forcibly end the service even if the remaining time of the expiration time is left (e.g., if the expiration time is still valid).

According to the alarm system 11 of the above structure, the alarm information, which has became useless, is limited from being kept provided for the alarm. In other words, the alarming means is completely stopped from informing the occupant (user) of the alarm information in accordance with the information of, for example, the occupant, the vehicle, and the surrounding of the vehicle. As a result, the alarm information, which is substantially appropriate to the actual condition, is informed to the occupant.

Figure 10:
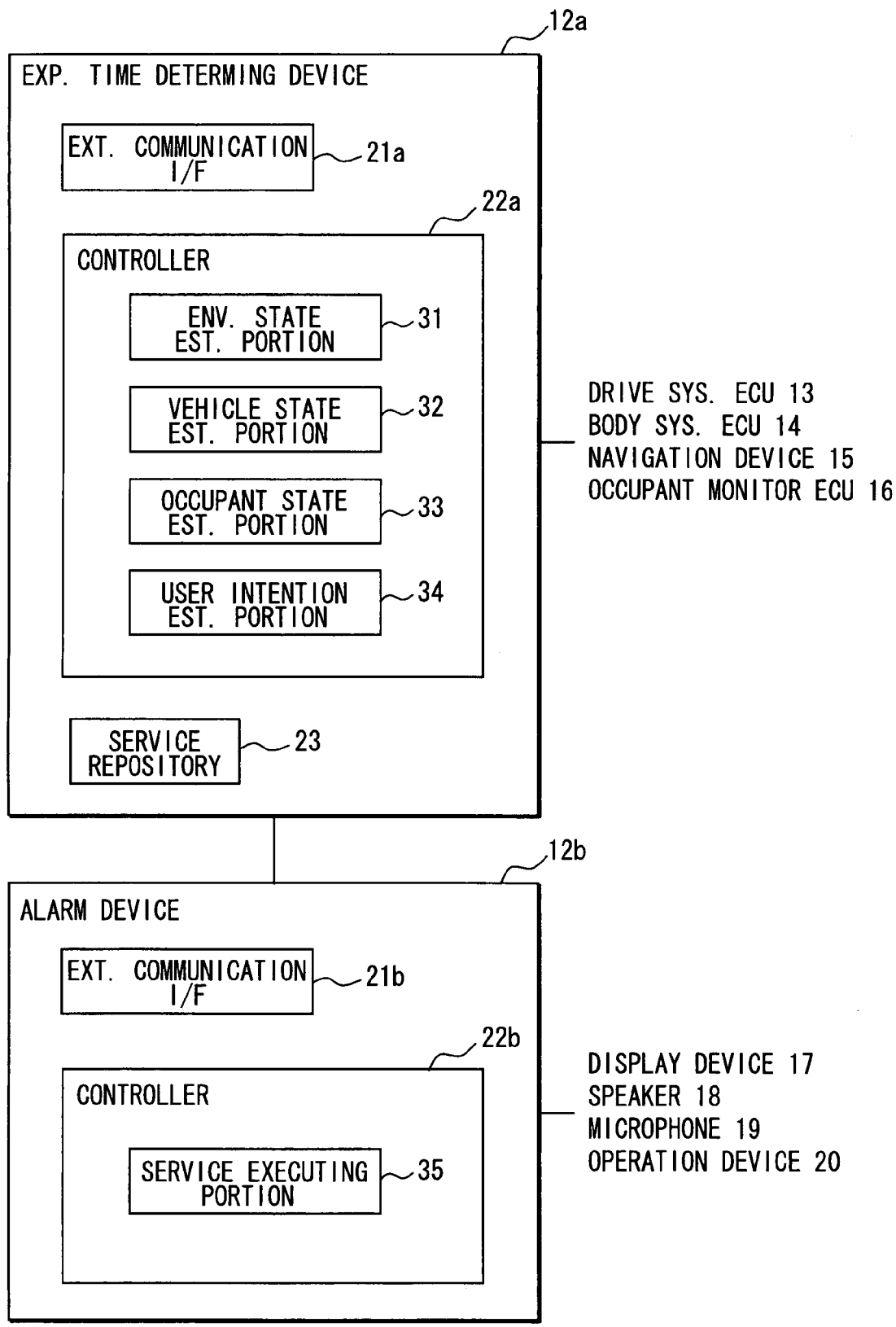
FIG. 10 is a block diagram, which shows another structure example of an alarm device.

(5) As shown in FIG. 10, each part comprising the alarm device 12 may be divided into an expiration time determining device 12a and an alarm device 12b. In other words, the expiration time determining device 12a includes an external communication I/F 21a, a controller 22a and the service repository 23. The controller 22a includes the environmental state estimating portion 31, the vehicle state estimating portion 32, the occupant state estimating portion 33, and the user intention estimating portion 34. In contrast, the alarm device 12b includes an external communication I/F 21b, and a controller 22b, which includes the service executing portion 35. Note that, the each part has function similar to a corresponding part in the above embodiments, basically. The communication among the environmental state estimating portion 31, the vehicle state estimating portion 32, the occupant state estimating portion 33, the user intention estimating portion 34, and the service executing portion 35 is performed through the external communication I/Fs 21a, 21b. In the above structure, advantages similar to the above embodiments are also achieved.

Here, when the expiration time determining device 12a is separated from the alarm device 12b as above, the controller 22a is equivalent to first controlling means, and the controller 22b is equivalent to second controlling means. Note that, when a predetermined change for canceling the stopping of the alarming means from informing the occupant corresponds to, for example, the expansion of the rainfall region at S345 as in the above embodiments. When the controller 22a captures such a change, the information is transmitted to the controller 22b. Also, a predetermined change for making the alarm information meaningless corresponds to, for example, a change that is associated with an estimation, where the alarm information, which is alarmed (provided) or suspended, is unnecessary for alarming after this. Also, the change is associated with another estimation, where the informing the occupant of the alarm information may cause a harmful result. For example, the predetermined change corresponds to a state, where the vehicle goes away from the tunnel in the other embodiment (4) as described above. When the controller 22a captures the above change, the controller 22a transmits the information to the controller 22b.

In Operation Example 4, the expiration time is extended based on the intention of the user (occupant). However, the expiration time may be alternatively changed (extended, shortened) based on the information of, for example, the occupant, the vehicle, and the surrounding of the vehicle. As a result, the alarm information, which is substantially appropriate to the actual condition, is informed to the occupant based on the changed expiration time.

Additional advantages and modifications will readily occur to those skilled in the art. The invention in its broader terms is therefore not limited to the specific details, representative apparatus, and illustrative examples shown and described.

What is claimed is:

1. An alarm device for a vehicle, comprising:
   state information obtaining means for obtaining as state information at least one of information of an occupant, information of the vehicle, and information of a surrounding of the vehicle;
   alarm information obtaining means for obtaining alarm information;
   alarming means for informing the occupant of the alarm information; and
   controlling means for determining an expiration time of the alarm information based on the state information obtained by the state information obtaining means when the controlling means receives the alarm information from the alarm information obtaining means, wherein the control means causes the alarming means to inform the occupant of the alarm information while the expiration time is valid.

2. The alarm device according to claim 1, further comprising instruction receiving means for receiving an instruction from the occupant, wherein:
   after the controlling means starts causing the alarming means to inform the occupant, the controlling means temporally stops the alarming means from informing the occupant of the alarm information when the instruction receiving means receives from the occupant a suspension instruction for stopping the alarming means from informing the occupant; and
   while the controlling means temporarily stops the alarming means from informing the occupant, the controlling means restarts causing the alarming means to inform the occupant of the alarm information as long as the expiration time is valid when the instruction receiving means receives from the occupant a restart instruction for restarting causing the alarming means to inform the occupant.

3. The alarm device according to claim 2, wherein the controlling means extends the expiration time when the instruction receiving means receives from the occupant an extension instruction for extending the expiration time after the controlling means starts causing the alarming means to inform the occupant or after the controlling means temporarily stops the alarming means from informing the occupant.

4. The alarm device according to claim 2, wherein after the controlling means starts causing the alarming means to inform the occupant or after the controlling means temporarily stops the alarming means from informing the occupant, the controlling means completely stops the alarming means from informing the occupant of the alarm information regardless of a validity of the expiration time when the instruction receiving means receives from the occupant a stop instruction for stopping the alarming means from informing the occupant in a future without continuing or restarting causing the alarming means to inform the occupant.

5. The alarm device according to claim 2, wherein:
   the controlling means determines whether or not it is required to cause the alarming means to inform the occupant of the alarm information in a future based on the state information obtained by the state information obtaining means after the controlling means starts causing the alarming means to inform the occupant or after the controlling means temporarily stops the alarming means from informing the occupant; and
   the controlling means completely stops the alarming means from informing the occupant of the alarm information regardless of a validity of the expiration time when the controlling means determines that it is not required to cause the alarming means to inform the occupant of the alarm information in the future.

6. The alarm device according to claim 2, wherein:
   in a case, where the controlling means receives another alarm information from the alarm information obtaining means while the controlling means causes the alarming means to inform the occupant of the alarm information, the controlling means determines another expiration time of the another alarm information based on the state information obtained by the state information obtaining means and the controlling means temporarily stops the alarming means from informing the occupant of the another alarm information.

7. The alarm device according to claim 6, wherein the controlling means causes the alarming means to periodically alternately inform the occupant of the alarm information and the another alarm information based on the remaining time of the corresponding one of the expiration time and the another expiration time.

8. The alarm device according to claim 2, wherein:
   in a case, where the controlling means receives another alarm information from the alarm information obtaining means while the controlling means causes the alarming means to inform the occupant of the alarm information, the controlling means determines another expiration time of the another alarm information based on the state information obtained by the state information obtaining means;
   the controlling means compares a remaining time of the expiration time of the alarm information, of which the alarm means currently informs the occupant, with a remaining time of the another expiration time of the another alarm information; and
   the controlling means causes the alarming means to inform the occupant of one of the alarm information and the another alarm information and temporarily stops the alarming means from informing the occupant of the other one of the alarm information and the another alarm information, the one having a remaining time shorter than that of the other one.

9. The alarm device according to claim 1, further comprising instruction receiving means for receiving an instruction from the occupant, wherein:
   after the controlling means starts causing the alarming means to inform the occupant, the controlling means temporarily stops the alarming means from informing the occupant of the alarm information when the instruction receiving means receives from the occupant a suspension instruction for stopping the alarming means from informing the occupant; and
   while the controlling means temporarily stops the alarming means from informing the occupant, the controlling means restarts causing the alarming means to inform the occupant in accordance with a remaining time of the expiration time.

10. The alarm device according to claim 1, further comprising instruction receiving means for receiving an instruction from the occupant, wherein:
    after the controlling means starts causing the alarming means to inform the occupant, the controlling means temporarily stops the alarming means from informing the occupant of the alarm information when the instruction receiving means receives from the occupant a suspension instruction for stopping the alarming means from informing the occupant; and while the controlling means temporarily stops the alarming means from informing the occupant, the controlling means restarts causing the alarming means to inform the occupant based on the state information obtained by the state information obtaining means as long as the expiration time is valid.

11. The alarm device according to claim 1, wherein the controlling means changes the expiration time, which the controlling means has determined, based on the state information obtained by the state information obtaining means.

12. An alarm system for a vehicle, comprising an expiration time determining device and an alarm device, wherein:
the expiration time determining device has state information obtaining means for obtaining as state information at least one of information of an occupant, information of the vehicle, and information of a surrounding of the vehicle;
the expiration time determining device has alarm information obtaining means for obtaining alarm information;
the expiration time determining device has first controlling means for determining an expiration time of the alarm information based on the state information obtained by the state information obtaining means, the first controlling means incorporating the expiration time to the alarm information and sending the incorporated alarm information to the alarm device;
the alarm device has alarming means for informing the occupant of the incorporated alarm information; and
the alarm device has second controlling means for causing the alarming means to inform the occupant of the incorporated alarm information received from the expiration time determining device while the expiration time, which is incorporated to the incorporated alarm information, is valid.

13. The alarm system according to claim 12, wherein:
the alarm device includes instruction receiving means for receiving an instruction from the occupant;
after the second controlling means starts causing the alarming means to inform the occupant, the second controlling means temporarily stops the alarming means from informing the occupant of the alarm information when the instruction receiving means receives from the occupant a suspension instruction for stopping the alarming means from informing the occupant; and
while the second controlling means temporarily stops the alarming means from informing the occupant, the second controlling means restarts causing the alarming means to inform the occupant of the alarm information as long as the expiration time is valid when the instruction receiving means receives from the occupant a restart instruction for restarting causing the alarming means to inform the occupant.

14. The alarm system according to claim 13, wherein the second controlling means extends the expiration time when the instruction receiving means receives from the occupant an extension instruction for extending the expiration time after the second controlling means starts causing the alarming means to inform the occupant or after the second controlling means temporarily stops the alarming means from informing the occupant.

15. The alarm system according to claim 13, wherein after the second controlling means starts causing the alarming means to inform the occupant or after the second controlling means temporarily stops the alarming means from informing the occupant, the second controlling means completely stops the alarming means from informing the occupant of the alarm information regardless of a validity of the expiration time when the instruction receiving means receives from the occupant a stop instruction for stopping the alarming means from informing the occupant in a future without continuing or restarting causing the alarming means to inform the occupant.

16. The alarm system according to claim 13, wherein:
when the state information obtained the state information obtaining means indicates a predetermined change for making the alarm information meaningless, the first controlling means outputs a signal to the second controlling means; and
after the controlling means starts causing the alarming means to inform the occupant or after the controlling means temporarily stops the alarming means from informing the occupant, the controlling means completely stops the alarming means from informing the occupant of the alarm information regardless of a validity of the expiration time when the second controlling means receives the signal from the first controlling means.

17. The alarm system according to claim 16, wherein the signal outputted by the first controlling means indicates that the state information obtained the state information obtaining means indicates the predetermined change for making the alarm information meaningless.

18. The alarm system according to claim 13, wherein:
when the first controlling means receives another alarm information from the alarm information obtaining means, the first controlling means determines another expiration time of the another alarm information based on the state information obtained by the state information obtaining means, the first controlling means incorporating the another expiration time to the another alarm information and sending the incorporated another alarm information to the second controlling means; and
when the second controlling means receives the incorporated another alarm information from the first controlling means while the second controlling means causes the alarming means to inform the occupant of the alarm information, the second controlling means temporarily stops the alarming means from informing the occupant of the incorporated another alarm information.

19. The alarm system according to claim 18, wherein the second controlling means alarms causes the alarming means to periodically alternately inform the occupant of the alarm information and the another alarm information based on the remaining time of the corresponding one of the expiration time and the another expiration time.

20. The alarm system according to claim 13, wherein:
when the first controlling means receives another alarm information from the alarm information obtaining means, the first controlling means determines another expiration time of the another alarm information based on the state information obtained by the state information obtaining means, the first controlling means incorporating the another expiration time to the another alarm information and sending the incorporated another alarm information to the second controlling means;
when the second controlling means receives the incorporated another alarm information from the first controlling means while the second controlling means causes the alarming means to inform the occupant of the alarm information, the second controlling means compares a remaining time of the another expiration time of the incorporated another alarm information with a remaining time of the expiration time of the alarm information, of which the alarming means currently inform the occupant;

the second controlling means causes the alarming means to inform the occupant of one of the alarm information and the another alarm information and temporarily stops the alarming means from informing the occupant of the other one of the alarm information and the another alarm information, the one having a remaining time shorter than that of the other one.

21. The alarm system according to claim 12, wherein:

the alarm device includes instruction receiving means for receiving an instruction from the occupant;

after the second controlling means starts causing the alarming means to inform the occupant, the second controlling means temporarily stops the alarming means from informing the occupant of the alarm information when the instruction receiving means receives from the occupant a suspension instruction for stopping the alarming means from informing the occupant; and while the second controlling means temporarily stops the alarming means from informing the occupant, the second controlling means restarts causing the alarming means to inform the occupant in accordance with a remaining time of the expiration time.

22. The alarm system according to claim 12, wherein:

the alarm device includes instruction receiving means for receiving an instruction from the occupant;

after the second controlling means starts causing the alarming means to inform the occupant, the second controlling means temporarily stops the alarming means from informing the occupant of the alarm information when the instruction receiving means receives from the occupant a suspension instruction for stopping the alarming means from informing the occupant; and when the state information obtained by the state information obtaining means indicates a predetermined change for canceling the stopping of the alarming means from informing the occupant, the first controlling means outputs a signal to the second controlling means; and while the second controlling means temporarily stops the alarming means from informing the occupant, the controlling means restarts causing the alarming means to inform the occupant when the second controlling means receives the signal from the first controlling means, as long as the expiration time is valid.

23. The alarm system according to claim 22, wherein the signal outputted by the first controlling means indicates that the state information obtained by the state information obtaining means indicates the predetermined change for canceling the stopping of the alarming means from informing the occupant.

24. The alarm system according to claim 12, wherein:

the first controlling means provides the second controlling means with the state information obtained by the state information obtaining means; and the second controlling means changes the expiration time based on the state information received from the first controlling means.

* * * * *